United States Patent [19]

Palmer

[11] Patent Number: 5,221,927
[45] Date of Patent: Jun. 22, 1993

[54] LIDAR-ACOUSTIC SOUNDING OF THE ATMOSPHERE

[75] Inventor: Allan J. Palmer, Longmont, Colo.

[73] Assignee: The United States of America as represented by the Secretary of Commerce, Washington, D.C.

[21] Appl. No.: 886,216

[22] Filed: May 20, 1992

[51] Int. Cl.$^5$ ............................................. G01S 13/00
[52] U.S. Cl. ......................................... 342/26; 356/5; 356/28.5
[58] Field of Search .................... 342/26; 356/5, 28.5

[56] References Cited

U.S. PATENT DOCUMENTS

| 2,822,536 | 2/1958 | Sandretto . | |
|---|---|---|---|
| 4,222,265 | 9/1980 | Ravussin | 342/26 X |
| 4,351,188 | 9/1982 | Fukushima et al. | 342/26 X |
| 4,611,912 | 9/1986 | Falk et al. | 356/5 |
| 4,613,938 | 9/1986 | Hansen et al. . | |
| 4,660,038 | 4/1987 | Greneker, III . | |
| 4,761,650 | 8/1988 | Masuda et al. | 342/26 |
| 5,029,999 | 7/1991 | Kremer et al. | 356/5 |

OTHER PUBLICATIONS

A. Jay Palmer, "Radiation-Induced Orientation of Atmospheric Aerosols", vol. 8, No. 2, Feb., 1991, J.Opt.Soc.Am.A, pp. 366-369.

Primary Examiner—Mark Hellner
Attorney, Agent, or Firm—William H. Wright; Diana M. Cox

[57] ABSTRACT

A method of remote sensing of atmospheric conditions based on the detection of acoustic modulation of lidar returns in the atmosphere. The measured modulation is caused by density changes of the lidar scattering elements induced by an acoustic wave launched collinearly with the lidar. Applications are disclosed for measuring atmospheric humidity, cloud particle size, and temperature profiling.

20 Claims, 2 Drawing Sheets

LIDAR-ACOUSTIC SOUNDING OF THE ATMOSPHERE

TECHNICAL FIELD

This invention relates to remote sensing of atmospheric conditions, and more particularly to a method of remote sensing of conditions using lidar-acoustic sounding.

BACKGROUND ART

Various methods have been employed for remote sensing of atmospheric conditions. Radio-acoustic sounding (RASS) temperature profiling has a range limitation imposed by winds and turbulence. Also, RASS is impractical for determining atmospheric humidity because of differential attenuation of the wide range of radar frequencies that must be used.

Those concerned with these and other problems recognize the need for an improved method for remote sensing of atmospheric conditions.

DISCLOSURE OF THE INVENTION

The present invention provides a method of remote sensing of atmospheric conditions based on the detection of acoustic modulation of lidar returns in the atmosphere. The measured modulation is caused by density changes in the lidar scattering centers induced by an acoustic wave launched from near the lidar. Applications are disclosed for temperature profiling and for measuring atmospheric humidity, cloud particle size.

An object of the present invention is the provision of an improved method of remote sensing of atmospheric conditions.

Another object is to provide a method that is useful in determining atmospheric humidity.

A further object of the invention is the provision of a method that is useful in determining cloud particle size.

Still another object is to provide a method that is used in determining temperature profile.

A still further object of the present invention is the provision of a method using lidar-acoustic sounding of the atmosphere.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
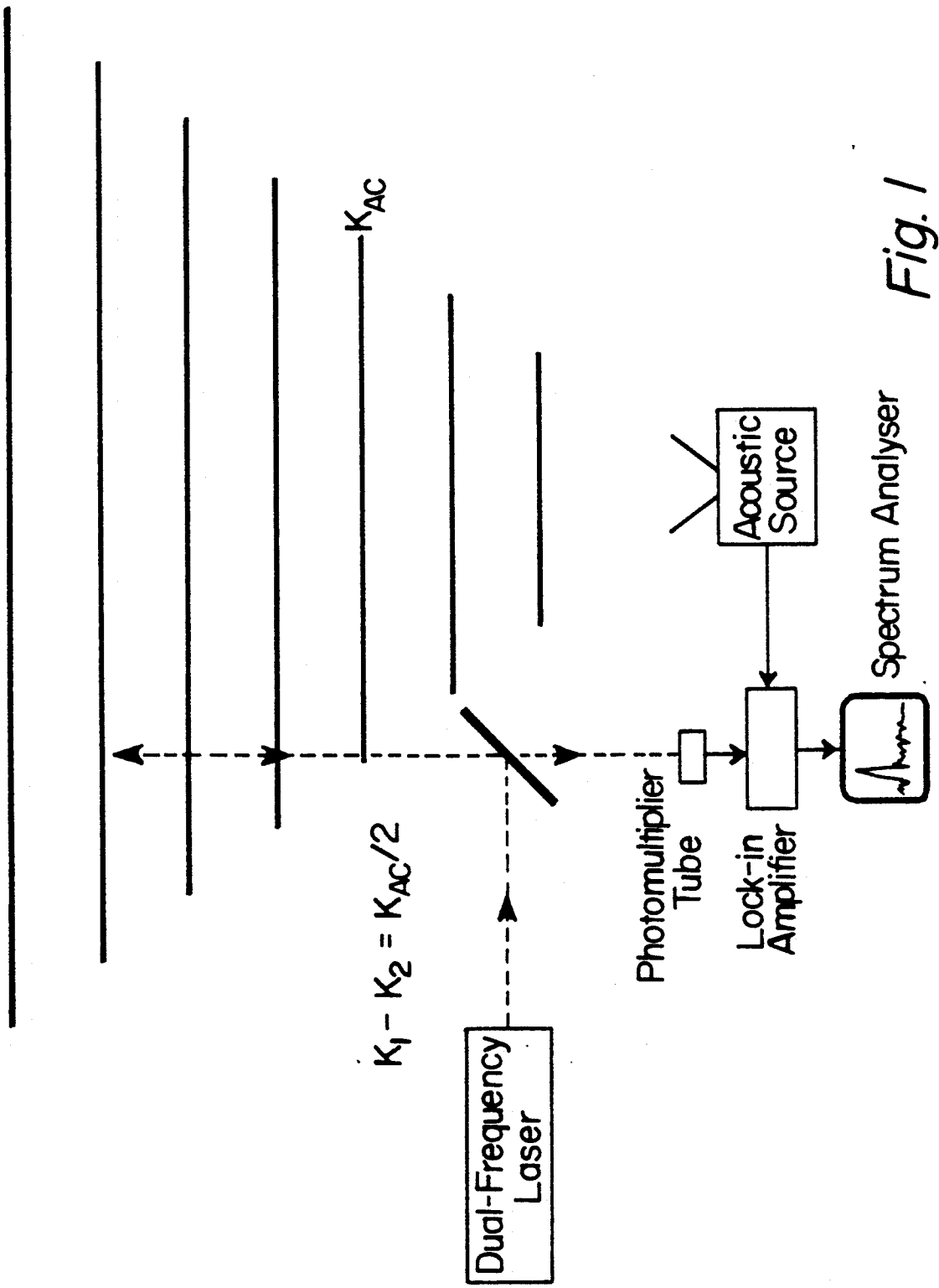
FIG. 1 is a conceptual illustration of the lidar-acoustic sounding technique.

This invention puts forward three new remote sensing applications based on the detection of acoustic modulation of lidar returns in the atmosphere. The modulation is caused by density changes in the lidar scattering centers induced by an acoustic wave launched from near the lidar.

The first application is lidar-acoustic sounding of humidity. The idea here is to measure the humidity-dependent, differential acoustic absorption (absorption vs. acoustic frequency) that takes place in the acoustic propagation path between the acoustic transmitter and the lidar scattering volume by measuring the modulation amplitude as function of acoustic frequency at a known range. Radio-acoustic sounding (RASS) has often been suggested (C.G. Little, Proc. IEEE 57, 571 {1969}) as a method for measuring the humidity-dependent acoustic absorption spectrum, but has remained impractical because of other spectrally dependent attenuation mechanisms that are present for the wide range of radar frequencies that must be used in a RASS differential acoustic absorption measurement. Lidar acoustic sounding of the acoustic modulation signal is expected to overcome these problems since a single lidar frequency can be used to sense a wide acoustic spectral range.

The next application is lidar-acoustic sounding of cloud particle sizes. Remote particle sizing of cirrus ice crystals is a particularly important need. At least one model for the radiation properties of cirrus has indicated that the feedback of cirrus clouds on climate change can be positive or negative, depending on the details of the cirrus ice crystal size distribution near a particle size of 20 $\mu$m (G. Stephens, S. Tsay, P. Stackhouse, and P. Flatua, J. Atm. Sci. 47, 1742 {1990}). Lidar-acoustic sizing would make use of the frequency dependence of the movement of a particle in response to an acoustic wave. Particles with viscous damping times comparable to the reciprocal of the acoustic frequency will give rise to a frequency-dependent lidar-acoustic modulation signal. Sensitivity to 20 $\mu$m ice particles requires an acoustic frequency near 200 Hz, which, fortuitously, is a frequency which suffers little attenuation in propagating to altitudes typical of cirrus.

The third application is lidar-acoustic temperature profiling of the atmosphere. Here, a technique analogous to the $\Delta$k-radar technique (W. J. Plant and D. L. Schuler, Radio Science 15, 605 {1980}) can be used to isolate the modulation due to a single acoustic wavenumber. This is done by simultaneously transmitting two lidar beams whose wavenumber difference, $\Delta$k, equals half the desired acoustic wavenumber. (A 100 Hz acoustic wave requires a frequency separation of the lidar beams of 50 MHz.) The power spectrum of the backscattered field product for the two frequency separated fields will then contain a "$\Delta$k" resonance line at the frequency of the selected acoustic wavenumber in the scattering volume. Knowing the vertical wind component, the frequency of the resonance line gives the temperature in the scattering volume. The advantage of this $\Delta$k-lidar-acoustic sounding system ($\Delta$k-LASS) over the standard radio-acoustic sounding system (RASS) for obtaining temperature profiles of the atmosphere is its potentially greater range. The range limit imposed by winds and turbulence on conventional RASS temperature profiling will not apply for the $\Delta$k-LASS technique since the transverse coherence of the acoustic wave, which is an important parameter for RASS and is reduced severely by winds and turbulence, is not as important for the $\Delta$k-LASS technique. The longitudinal coherence length of the acoustic wave remains an important parameter for $\Delta$k-LASS and is about equal to the desired range resolution of near a kilometer at the 10 km range of interest.

The basic processed signal for the lidar-acoustic sounding is chosen to be the cross correlation spectrum between the scattered field product and a local oscillator phased locked with the acoustic frequency, $\omega_{ac}$:

$$S_{\Delta k}(\omega) = \int <E_1(t+\tau)E_2^*(t+\tau) \cos(\omega_{ac}\tau) > \exp(i\omega\tau)d\tau \quad (1)$$

where $<>$ indicates time averaging.

A correlation spectrum is chosen in order to keep the processed signal no higher than 2nd order in the scattered field because of the weakness of the acoustic modulation signal.

The relevant signal-to-noise ratios have been computed for the three lidar-acoustic sounding applications (A. J. Palmer, J.Opt.Soc.Am.A submitted, July 1991, incorporated herein. For state-of-the-art atmospheric lidars, it can be shown that the dominant source of noise for the three lidar-acoustic applications is speckle noise, i.e. the broad spectrum of scattered radiation caused by turbulent motion of the scattering elements (A. J. Palmer, J.Opt Soc.Am.A submitted July 1991. The speckle-induced signal-to-noise ratio for both $S(\omega)$ and $S_{66\ k}(\omega)$ is (A. J. Palmer, J. Opt.Soc.Am.A submitted, July 1991

$$SNR = \tfrac{1}{2}p(\Gamma_{speckle}/\Gamma_R)N^{\tfrac{1}{2}} \quad (2)$$

where p is the acoustic-induced fractional overpressure in the scattering volume, $\Gamma_R$ and $\Gamma_{speckle}$ are the spectral widths of the acoustic modulation signal and speckle background respectively, and N is the number of statistically independent spectra averaged. Eq. (2) applies to $S(\omega)$ only if the lidar pulse length is short compared to the acoustic wavelength projected along the lidar look direction. This requirement is not necessary for the $\Delta k$ method, which can also be applied to the first two applications if lidar pulse lengths longer than the acoustic wavelength are used.

The practicality of the above lidar-acoustic sounding techniques can be judged by the achievable values of SNR for reasonable acoustic and lidar operating parameters. The acoustic fractional overpressures that can be transmitted to the 10 km range of interest by existing RASS acoustic sources is about $0.2 \times 10^{-6}$. For the $\Delta k$-LASS process, $\Gamma_R$ is limited by the coherence length of the acoustic and laser beams and can be as small as 0.05 Hz. For the other lidar-acoustic processes, $\Gamma_R$ will be limited by the acoustic source and might be made as small as a few Hz. $\Gamma_{speckle}$ will be Nyquist limited to half the lidar pulse rate of, say, a few hundred Hz. A crucial advantage of using direct detection lidars for lidar-acoustic sounding is the ability to carry out spatial as well as temporal averaging of the clutter spectrum. In this case, the number N that enters Eq. (3) can be written, $N = N_t N_{spk}$, where $N_t$ is the number of spectra averaged over time and $N_{spk}$ is the number of speckle elements captured by the receiver aperture. By using large receiver apertures and defocused lidar beams $N_{spk}$ can readily be made on the order of $10^4$ for visible and near infrared lidars.

Using the above parameter values in Eq. (3) and the relationship $t_{dwell} = N_t \pi/\Gamma_R$ for the minimum dwell time required, one sees that SNR values exceeding unity can be achieved for quite reasonable dwell times. The required dwell time for acquiring a $\Delta k$-LASS spectrum which has an SNR and transform-limited $\Gamma_R$ value adequate for determining the temperature to a specified accuracy is presented in FIG. 2.

Figure 2:
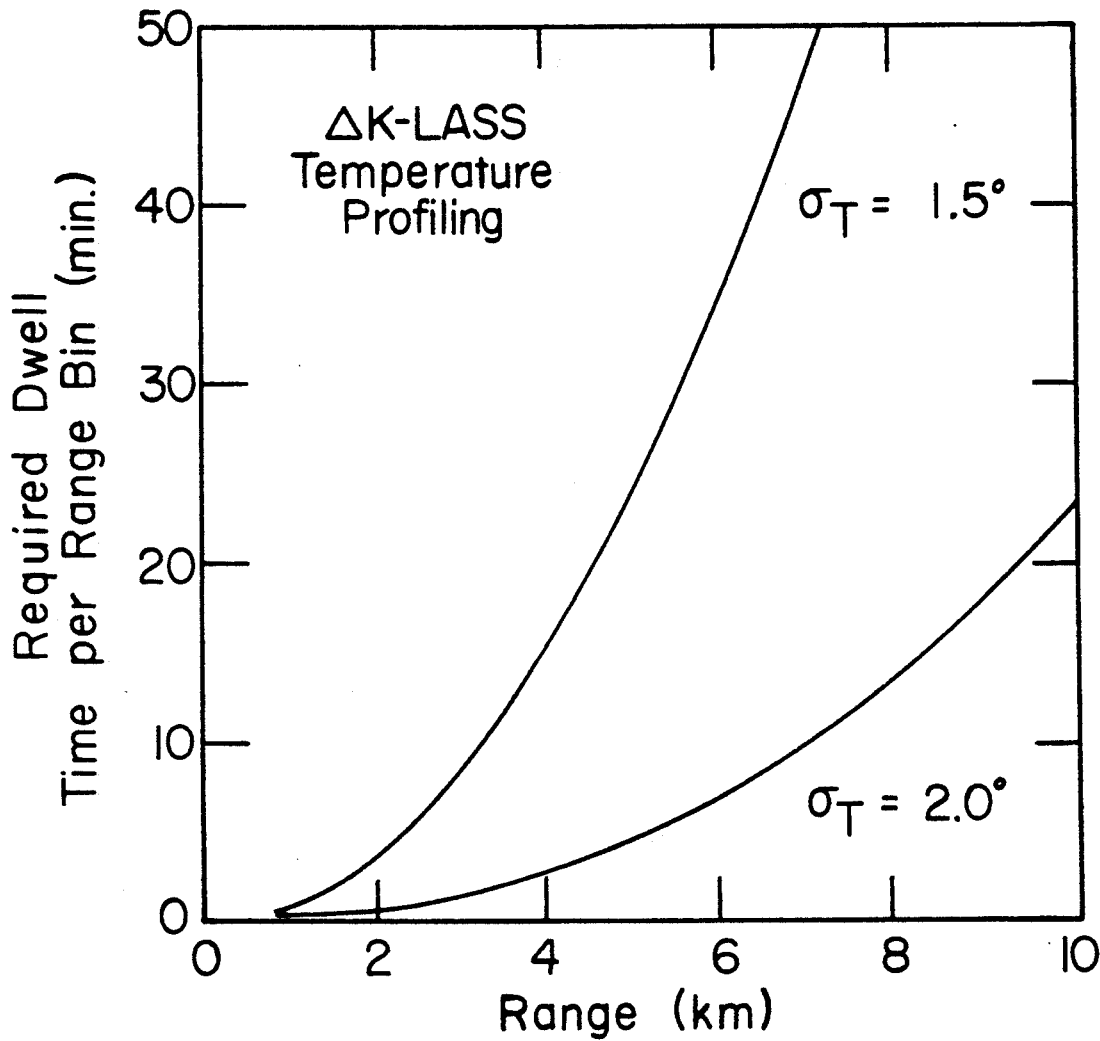
FIG. 2 is a graphic illustration showing predicted dwell time per range bin required for achieving the indicated temperature measurement accuracies using the $\Delta K$-LASS technique.

The graphic illustration of FIG. 2 shows the estimated minimum dwell time per range resolution element required for achieving a given temperature measurement accuracy, $\sigma_T$ using the $\Delta k$-LASS technique. The acoustic wave is assumed to be broadcast collinearly with the lida from a 100 Hz, 500 W·m² source with a bandwidth of 1 Hz corresponding to a range resolution of [18] 50 m. The required frequency separation of the two lidar beams is 50 MHz. Other parameters used for the estimate are: $N_{speckle} = 10^4$, Nyquist frequency = 500 Hz, T = 240K, and $\gamma = 1.4$.

The methods described above illustrate improved remote sensing of atmospheric conditions including atmospheric humidity, cloud particle size, and temperature profiling.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A method of remote sensing of atmospheric conditions, comprising the steps of:
   transmitting a lidar beam from a lidar transmitter at a predetermined direction into the atmosphere;
   transmitting an acoustic wave from an acoustic transmitter into the atmosphere collinearly with the lidar transmitter; and
   measuring acoustic modulation of lidar returns in the atmosphere to determine specific atmospheric conditions.

2. The method of claim 1, further including the step of measuring differential acoustic absorption in an acoustic propagation path between the acoustic transmitter and lidar scattering volume to determine atmospheric humidity.

3. The method of claim 2, wherein modulation amplitude is measured as a function of acoustic frequency at a known range.

4. The method of claim 1, further including the step of measuring frequency dependence of movement of cloud particles in response to the transmitted acoustic wave to determine the size of the cloud particles.

5. The method of claim 4, wherein the transmitted acoustic wave has a frequency near 200 Hz.

6. The method of claim 1, further including the step of simultaneously transmitting two lidar beams having a wavenumber difference, $\Delta K$, approximately equal to one-half of the acoustic wavenumber to determine the temperature profile of the atmosphere.

7. The method of claim 6, further including the step of determining a $\Delta K$ resonance line at the frequency of the selected acoustic wavenumber in the scattering volume.

8. The method of claim 7, further including the step of determining the temperature in the scattering volume from the frequency of the $\Delta K$ resonance line and a known vertical wind component.

9. A method of remote sensing of atmospheric conditions, comprising the steps of:
   simultaneously transmitting two lidar beams having predetermined lidar wavenumbers and having a wavenumber difference, $\Delta K$, the lidar beams being transmitted from a lidar transmitter at a predetermined direction into the atmosphere;
   transmitting an acoustic wave having a predetermined acoustic wavenumber from an acoustic transmitter into the atmosphere collinearly with the lidar transmitter, wherein $\Delta K$ is approximately equal to one-half the acoustic wavenumber; and measuring acoustic modulation of lidar returns in the atmosphere to determine specific atmospheric conditions.

10. The method of claim 9, further including the step of determining a $\Delta K$ resonance line at the frequency of the selected acoustic wavenumber in the scattering volume.

11. The method of claim 10, further including the step of determining the temperature in the scattering volume from the frequency of the $\Delta K$ resonance line and a known vertical wind component.

12. The method of claim 9 further including the step of determining the temperature profile of the atmosphere.

13. The method of claim 9 wherein the acoustic wavenumber is small compared to the lidar wavenumber.

14. The method of claim 13 further including the step of determining the atmospheric humidity.

15. The method of claim 13 further including the step of determining the size of cloud particles.

16. The method of claim 6 further including the step of choosing a basic processed signal to be a cross correlation spectrum between a scattered field product and a local oscillator phase locked with the acoustic wavenumber.

17. The method of claim 9; wherein, the lidar pulse length is longer than the acoustic wavelength.

18. The method of claim 1; wherein, the acoustic wavenumber is small compared to the lidar wavenumber.

19. The method of claim 2, wherein, the lidar pulse length is short compared to the acoustic wavelength.

20. The method of claim 4; wherein, the lidar pulse length is short compared to the acoustic wavelength.

* * * * *